Jan. 15, 1924.
F. KOHLBERGER
1,480,559
BUS BODY FOR MOTOR PROPELLED VEHICLES
Filed Nov. 8, 1921
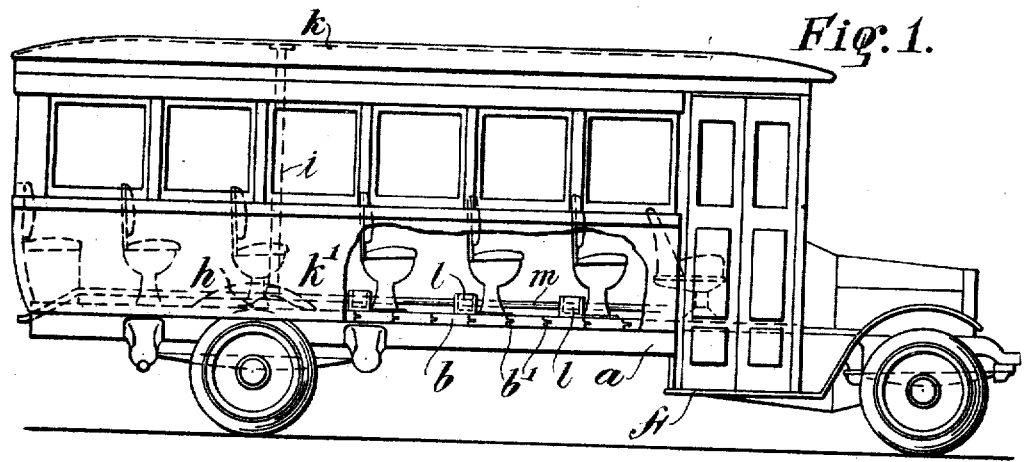
Fig. 1.
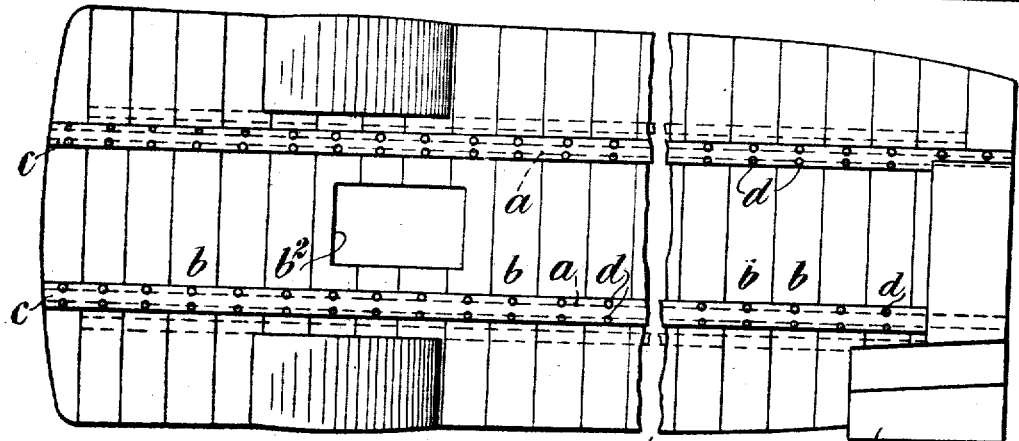
Fig. 2.
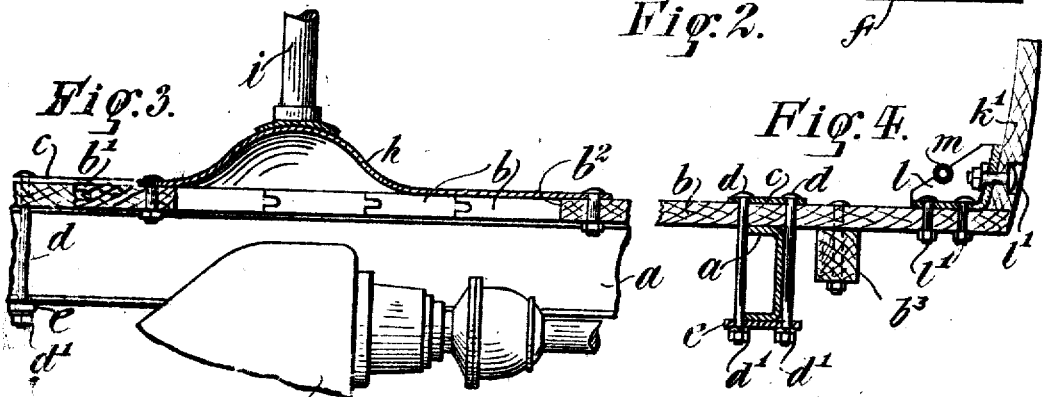
Fig. 3.  Fig. 4.
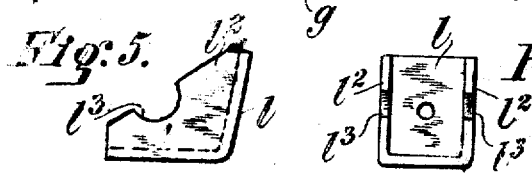
Fig. 5.  Fig. 6.
INVENTOR
Frank Kohlberger
BY
Redding & Greeley
ATTORNEYS Patented Jan. 15, 1924.

1,480,559

UNITED STATES PATENT OFFICE.

FRANK KOHLBERGER, OF NEW YORK, N. Y., ASSIGNOR TO INTERNATIONAL MOTOR COMPANY, OF NEW YORK, N. Y., A CORPORATION OF DELAWARE.

BUS BODY FOR MOTOR-PROPELLED VEHICLES.

Application filed November 5, 1921. Serial No. 513,636.

*To all whom it may concern:*

Be it known that I, FRANK KOHLBERGER, a citizen of the United States, residing in the borough of Queens of the city of New York, in the State of New York, have invented certain new and useful Improvements in Bus Bodies for Motor-Propelled Vehicles, of which the following is a specification, reference being had to the accompanying drawing, forming a part hereof.

With the recent development of jitney busses for transporting passengers new considerations of body design conducive to the safety and comfort of the passengers have forced themselves upon the attention of engineers. It has been the general practice in body building heretofore to form the floor of the body within a self-contained framing which might be mounted as a unitary structure on suitable sills carried with the frame of the vehicle. Ordinarily the floor planks are extended longitudinally of the vehicle requiring the selection of planks of uniform thickness, form and quality and, consequently, of greater expense than shorter lengths. Further, the placing of the body on transverse sills resting on the vehicle frame throws the center of gravity high and results in undue side sway and tipping. This is naturally a source of discomfort and, indeed, a danger to the passengers within the body, since the movements of the vehicle frame are tremendously multiplied before being impressed upon the passengers. Further, passenger vehicles must be so constructed as to permit the entrance and egress of passengers with the greatest possible expedition and convenience. One of the most important factors is in the number and character of the steps. Where, as heretofore, the bodies have been set up on sills their height has necessitated the use of two or more steps with resulting inconvenience, danger and delay in operation.

The object of the present invention is to overcome the objections above indicated by providing a floor for a bus body or the like which may be built of short lengths of planking extending transversely of the vehicle frame and resting directly thereon without the interposition of sills. This construction results in the lowering of the body by several inches so as to permit passengers to step directly into or out of the bus. Further, it lowers the center of gravity of the vehicle and the center of oscillation so as to improve the riding qualities by reducing the side sway and tipping and to eliminate the element of danger to be found in busses where the bodies are set high. The improved construction has the further advantage that the expense of the body is materially reduced by permitting the use of short lengths of planks in place of the longer selected planks necessary for longitudinal planking and by permitting the ready fabrication of a flooring without necessitating the construction of a special framing of suitable dimensions prior to the assembling therein of the floor planks. A further object of the invention is to provide a floor for a vehicle body in which may be cheaply and conveniently formed a suitable well for clearance of the differential housing.

These and other objects will appear hereinafter in connection with the illustrated embodiment of the invention in the drawing, wherein—

Figure 1 is a view in side elevation of a bus body having the floor constructed in accordance with the present invention, a part of the side being broken away in the interest of clearness.

Figure 2 is a view in plan of a fragment of the improved floor and taken on a larger scale.

Figure 3 is a detail view in section of a, fragment of the floor showing particularly the well for the differential housing.

Figure 4 is a fragmentary detail view in transverse section through the flooring and one of the side frame members of the vehicle and showing a suitable way of securing the floor planks to the side frame member and to the side wall of the body.

Figures 5 and 6 are detail views of the pressed steel corner pieces illustrated in Figure 4.

There is illustrated in the accompanying drawing so much of a motor propelled vehicle as is necessary for an understanding of the application of the invention thereto. The chassis of the vehicle includes longitudinal side frame members, such as $a$, usually formed as channels. On these channels are mounted directly transverse floor planks $b$ which are preferably interengaged, as by tongue and groove joints indicated at $b'$. The planks are preferably secured to longitudinal floor beams $b^3$ which may extend along the underside of the floor just outside of, but independent of, the frame members $a$. This forms a unitary floor. The invention is not to be limited to the interengagement of the proximate planks, but it is evident that the tongue and groove provision will insure a smooth, tight floor and assist in maintaining the planks in alinement and in holding them against relative displacement. The planks have laid over them longitudinally extending metal straps $c$ which preferably lie directly over the side frame members $a$, respectively. Through each of these straps $c$ pass bolts $d$, usually two in number for each plank $b$, the bolts extending downwardly at opposite sides of the channel $a$ and interlocked and retained in place by a strap $e$ and nuts $d'$ threaded on the lower ends of the bolts, respectively. Each pair of bolts $d$ for each plank $b$ will serve to secure the plank fixedly to the side channel $a$ lying directly beneath the longitudinal strap $c$. Since the bolts $d$ for the different planks are placed along the channel $a$ the necessary degree of flexibility to compensate for the frame distortion is afforded and yet the straps $c$ hold the planks in place with sufficient rigidity. The structure described is one which permits the ready fabrication of the floor of a body with short and inexpensive lengths of planking and without the construction of a special framing of suitable form and dimensions for the particular vehicle to which it is applied. It makes it unnecessary to select long length of planks of uniform thickness and form as is the case where these planks are placed longitudinally of the vehicle. Further, the mounting of the planks directly on the vehicle frame eliminates the interposition of sills for the floor framing and thereby lowers the entire body and its center of gravity. This lowering which, in ordinary constructions, amounts perhaps to eight inches, is of great importance in passenger busses since it eliminates at least one step and, as in the illustrated embodiment, enables the passengers to enter or leave the body by the use of a single step $f$. The saving of time in the operation of busses and the greater safety will appear at once. Further, by the lowering of the center of gravity of the vehicle, an additional degree of safety is secured since the vehicle is less liable to tip over.

But of even greater practical importance is the advantage resulting from the better riding qualities afforded. The center of oscillation of the body is lowered so that movements which cause side sway are not multiplied to so great a degree by the time they are impressed upon the passenger. Further, any tipping of the body is not compounded so greatly so the passengers remain in more comfortable positions.

A further feature of the invention has to do with the provision of a well within the floor to accommodate the differential housing. This is of particular importance in some types of vehicles and, at all events, where found, it is desirable to provide it with the least expense and without weakening the body. As shown in Figure 2, the planks $b$ are cut out, as $b^2$, directly over the differential housing $g$, the relation of the planks being such as not materially to weaken the floor structure and yet permit the cutting out of the well as required. It is evident that were the planking placed longitudinally a special framing would have to be built for the well. No facing or reinforcing of the perimeter of the opening $b^2$ is necessary. Over the well may be placed a suitable covering, such as $h$, of pressed metal, the configuration of which will preferably be such as to minimize the danger of tripping. As shown, a dome-shape will accomplish this end. On the dome-shaped covering $h$ may be secured a vertical hand rail $i$ which may extend to the roof $k$ of the body and be secured thereto so as to remain fixedly in position and assist in the support of the roof. The entire organization of parts as described is at once compact, strong and inexpensive and in keeping with the requirements of the most advanced practise in bus bodies.

As shown particularly in Figures 4—6 it is proposed to connect some or all of the individual planks $b$ with the side $k'$ of the body by means of pressed steel corner pieces $l$ through which pass retaining bolts $l'$ into the planking $b$ and the side $k'$. This pressed steel corner piece is formed as an angle having end webs $l^2$ to give additional strength. If desired, the end webs $l^2$ may be stamped out, as at $l^3$, to provide a supporting seat for pipes $m$ of a heating system or other units to be supported. These pressed steel corner pieces afford an inexpensive and rigid connecting means between the floor and the sides and make it unnecessary to mortise or otherwise interlock these parts.

Changes in detail of design will suggest themselves to those skilled in the art but are to be considered within the scope of the invention provided they fall within the range of the appended claim.

I claim as my invention:

In body constructions for self-propelled motor vehicles, cross planks supported directly on the side frame members of the chassis, means to secure the planks in place on the side frame members, a well to provide clearance for the differential housing formed by sawing out an opening in the planks over the housing, a dome-shaped cover secured to the floor and completing the well, and a suitable hand rail secured to the dome-shaped cover and extending upwardly through the body and secured at its upper end to the roof to afford support thereto.

This specification signed this 3rd day of November 1921.

FRANK KOHLBERGER